(12) United States Patent
Schultz et al.

(10) Patent No.: US 7,529,878 B2
(45) Date of Patent: May 5, 2009

(54) METHOD AND SYSTEM OF MEMORY MANAGEMENT

(75) Inventors: Russell Alvin Schultz, Austin, TX (US); David A. Moore, Cedar Park, TX (US); Matthew Henson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 334 days.

(21) Appl. No.: 11/118,593

(22) Filed: Apr. 29, 2005

(65) Prior Publication Data

US 2006/0248265 A1   Nov. 2, 2006

(51) Int. Cl.
*G06F 12/08* (2006.01)

(52) U.S. Cl. .............................. 711/6; 711/3; 711/202; 711/203; 711/206

(58) Field of Classification Search ............ 711/3, 711/6, 170, 202–203, 206
See application file for complete search history.

(56) References Cited

U.S. PATENT DOCUMENTS 6,601,083 B1 * 7/2003 Reznak ....................... 709/104
6,854,025 B2   2/2005 Knight et al.
7,197,605 B2   3/2007 Schmisseur et al.
2002/0108025 A1 * 8/2002 Shaylor ....................... 711/203

OTHER PUBLICATIONS

Park, Chanik, et al. "Complier-Assisted Demand Paging for Embedded Systems with Flash Memory", 4th ACM International Conference on Imbedded Software (EMSOFT'04), Pisa, Italy, Sep. 27-29, 2004, pp. 114-124.

* cited by examiner

*Primary Examiner*—Jasmine Song
(74) *Attorney, Agent, or Firm*—Toler Law Group

(57) ABSTRACT

The disclosure is directed to a computational system including a processor and a memory management unit accessible to the processor. The processor is configured to access a common virtual memory space to perform a first task of a plurality of tasks and is configured to access the common virtual memory space to perform a second task of the plurality of tasks. The common virtual memory space references a first set of instructions associated with the first task and references a second set of instructions associated with the second task. The memory management unit is configured to determine a physical memory location of at least one of the first and second sets of instructions when the associated first or second task is to be performed by the processor.

24 Claims, 2 Drawing Sheets

METHOD AND SYSTEM OF MEMORY MANAGEMENT

FIELD OF THE DISCLOSURE

This disclosure, in general, relates to methods and systems of memory management.

BACKGROUND

Consumer electronic devices, such as cell phones, digital music players, and other handheld devices, run increasingly complicated algorithms, such as algorithms for decoding compressed digital audio and video data. As the complexity of these algorithms increases, so too does the memory usage for storing the algorithms.

Generally, instructions to be executed are stored in a dedicated instruction cache of a microprocessor. For large algorithms, the sets of instructions become too large to fit on the dedicated instruction cache. This capacity deficit results in cycles of loading a subset of the instructions into the dedicated instruction cache from non-volatile memory, executing instructions of the subset and swapping the subset out for the next subset of instructions. In addition to the time required to load instructions, writing instructions from memory to the cache occupies the system bus. Frequently accessing non-volatile memory also reduces the throughput of data into the microprocessor.

In real-time processing, such as decoding audio and video for playback, these delays can decrease the performance of a device. To reduce memory access latency, designers have turned to small intermediate level caches to retrieve and store frequently used instruction sets for easier access by the microprocessor. These small intermediate level caches are referred to as level 2 or level 3 caches and are typically static random access memory (SRAM) devices located close to the microprocessor. However, SRAM is expensive and increases product cost.

To manage access to instruction sets and non-instruction data, typical systems rely on manual overlays in which a programmer manages memory by programmatically moving code into a desired location prior to use. Often, instruction sets are overwritten as new instruction sets are used. Such systems rely on the programmer to correctly allocate memory and move instructions and non-instruction data to desired locations prior to accessing the instructions and non-instruction data. For large programs and systems running many tasks, such memory management is difficult, especially when more than one programmer is coding system instructions.

Alternatively, systems may use a memory management unit. Each task, such as word processing, spreadsheets, and user interface interaction, is provided with a virtual memory space. As the processor accesses a particular virtual memory space to perform a particular task, the instructions and non-instruction data associated with that task are moved to physical memory locations more easily accessed by the processor, such as to level 2 cache. The memory management unit maintains a record of the location of the instructions and non-instruction data in the physical memory. Instructions and non-instruction data associated with tasks other than the particular task being executed may be written to non-volatile storage, such as hard drives, or may be written to higher-level cache. However, task specific virtual addressing as implemented in traditional memory management units results in a significant amount of disk access and, as a result, large power consumption. Frequently accessing non-volatile storage can also lead to delays when switching between tasks. In another embodiment, large higher-level caches, such as SRAM, are used. These higher-level caches are typically expensive and consume power. As such, typical memory management unit implementation is unsuitable for portable devices and other devices with limited access to power.

As such, an improved system and method of memory management would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

Figure 1:
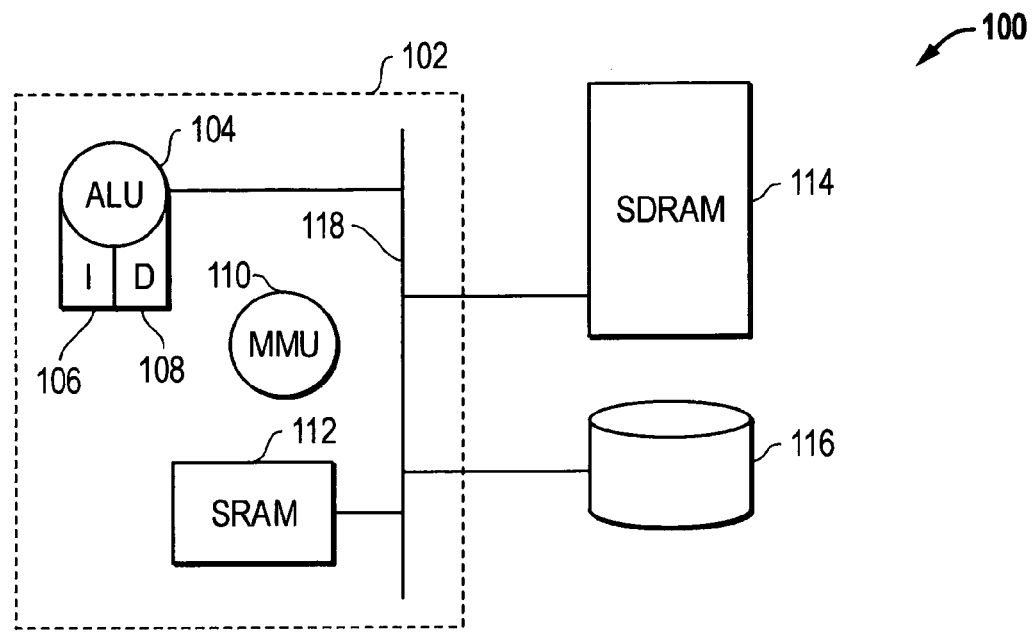
FIG. 1 includes an illustration of an exemplary computational system.

In one particular embodiment, the disclosure is directed to a computational system including a processor and a memory management unit. The processor is configured to access a common virtual memory space when performing a first task of a plurality of tasks and is configured to access the common virtual memory space when performing a second task of the plurality of tasks. When accessed, the instruction sets are moved from non-volatile storage to volatile storage or cache storage. Generally, an instruction set associated with a particular task is not written to the non-volatile storage when a different task is performed. In addition, non-instruction data associated with the particular task may not be written to non-volatile storage when a different task is performed.

In one embodiment, the computational system includes two directly addressable memories of differing access efficiency, such as different access times and different rates of data transfer. For example, the first memory may include a cache memory located on a substrate common to the processor. The second memory may include synchronous dynamic random access memory (SDRAM) accessible to the processor via a data bus. Further, the computational system may include non-volatile storage or indirectly addressable secondary storage, such as flash memory or a hard drive.

In one particular embodiment, the disclosure is directed to a computational system including a processor configured to access a common virtual memory space to perform a first task of a plurality of tasks and configured to access the common virtual memory space to perform a second task of the plurality of tasks. The common virtual memory space references a first set of task instructions associated with the first task and references a second set of task instructions associated with the second task. The computational system also includes a memory management unit accessible to the processor. The memory management unit is configured to determine a physical memory location of at least one of the first and second sets of task instructions when the associated first or second task is to be performed by the processor.

In another embodiment, the disclosure is directed to a method of performing a plurality of computational tasks. The method includes accessing a first set of task instructions via a common virtual memory space. The first set of task instructions is associated with a first computational task. The common virtual memory space references the first set of task instructions and a second set of task instructions. The second set of task instructions is associated with a second computational task. The method also includes determining a physical location of the first set of task instructions using a memory management unit and accessing the second set of task instructions via the common virtual memory space.

In a further exemplary embodiment, the disclosure is directed to a computational system including a processor configured to access a common virtual memory space to perform a first task of a plurality of tasks and configured to access the common virtual memory space to perform a second task of the plurality of tasks. The common virtual memory space references a first set of task instructions associated with the first task and references a second set of task instructions associated with the second task. The computational system also includes a first directly addressable memory accessible to the processor, a second directly addressable memory accessible to the processor, and a memory management unit accessible to the processor. The first directly addressable memory has higher access efficiency than the second directly addressable memory. The memory management unit is configured to determine a physical memory location of at least one of the first and second sets of task instructions when the associated first or second task is to be performed by the processor. The physical location is an address of one of the first directly addressable memory and the second directly addressable memory.

FIG. 1 is a block diagram illustrating an exemplary computational system 100 that includes a substrate 102. The substrate 102 includes a processor 104, dedicated instruction cache 106 accessible to the processor 104, and dedicated data cache 108 accessible to the processor 104. The processor 104 is connected to a data bus 118. In one embodiment, the processor 104 is an arithmetic logic unit, such as an ARM® processor.

The computational system 100 includes a first directly addressable memory 112 and a second directly addressable memory 114. For example, the first directly addressable memory 112 may be a general purpose cache memory, such as static random access memory (SRAM), coupled to the data bus 118. The first directly addressable memory 112 may be located on the substrate 102 in common with the processor 104. For example, the first directly addressable memory 112 and the processor 104 may be formed on a common silicon substrate.

In one particular embodiment, the computational system 100 includes a memory management unit (MMU) 110. The MMU 110 may be located on the substrate common to the processor 104. In one exemplary embodiment, the MMU 110 includes a table for matching virtual addresses to physical addresses, such as a Translation Look-aside Buffer (TLB). Requests for memory access are intercepted by the MMU 110, which determines the physical memory location of a virtual address.

In one example, the second directly addressable memory 114 is synchronous dynamic random access memory (SDRAM), typically located separately from the substrate 102 and having lower access efficiency than SRAM. The second directly addressable memory 114 is accessible to the processor 104 via a data bus, such as the data bus 118. Alternatively, the second directly addressable memory 114 may be accessed by a separate data bus other than the data bus 118.

In another exemplary embodiment, the computational system 100 includes indirectly addressable secondary storage, such as non-volatile storage 116, accessible to the processor 104 via the data bus 118. An exemplary embodiment of the non-volatile storage 116 includes a hard drive, a flash memory, or a combination thereof. The non-volatile storage 116 includes sets of task instructions. Each set of task instructions is associated with a task. In one embodiment, a task is implemented as a program operable by the processor 104 to perform a function. In one particular embodiment, the sets of task instructions are read-only instruction sets. The non-volatile storage 116 may also include non-instruction data.

When performing a task, the processor 104 accesses a set of instructions or data associated with the task via a common virtual memory space. For example, the set of instructions is operable by the processor 104 to reference non-instruction data and subsequent instructions via the common virtual memory space. The MMU 110 determines the physical location of the referenced instructions. For example, the MMU 110 includes a table translating between the virtual address of the instructions and the physical location of the instructions. In one embodiment, accessed instructions are moved from the non-volatile storage 116 to the first directly addressable memory 112 for faster access by the processor. In another example, the instruction set is written from the second directly addressable memory to the first directly addressable memory 112 by way of the data bus 118. The MMU 110 updates the virtual address map to indicate that the new instruction set is available. Alternatively, the accessed instructions are written to the second directly addressable memory 114. When a second task is performed, the processor accesses a second set of instructions or data by accessing the virtual memory space.

Figure 2:
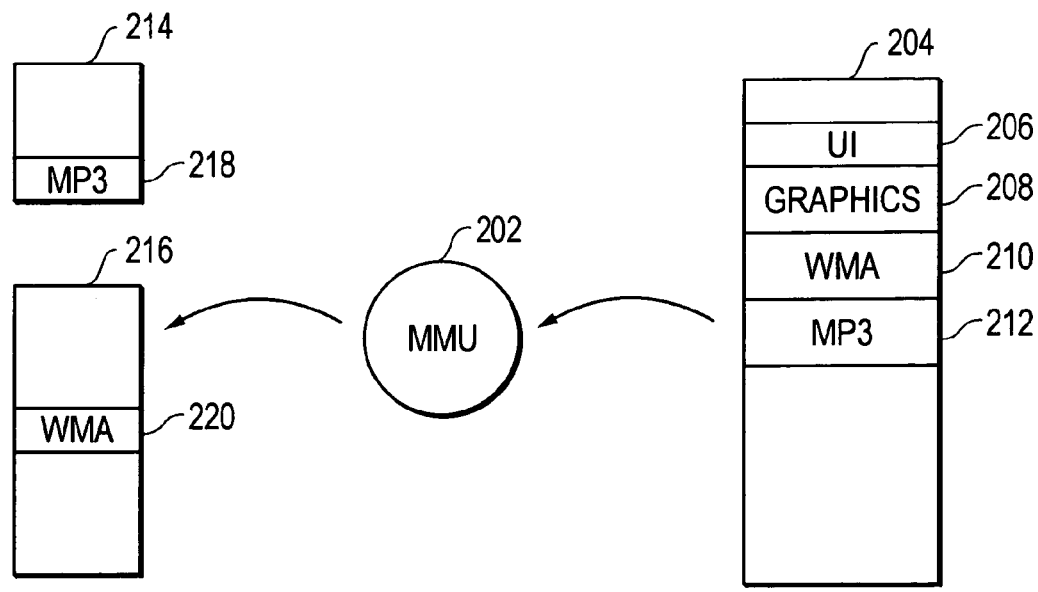
FIGS. 2 and 3 include illustrations of an exemplary embodiment of a memory management unit, such as for use in the exemplary computational system illustrated in FIG. 1.
Figures 3, 4:
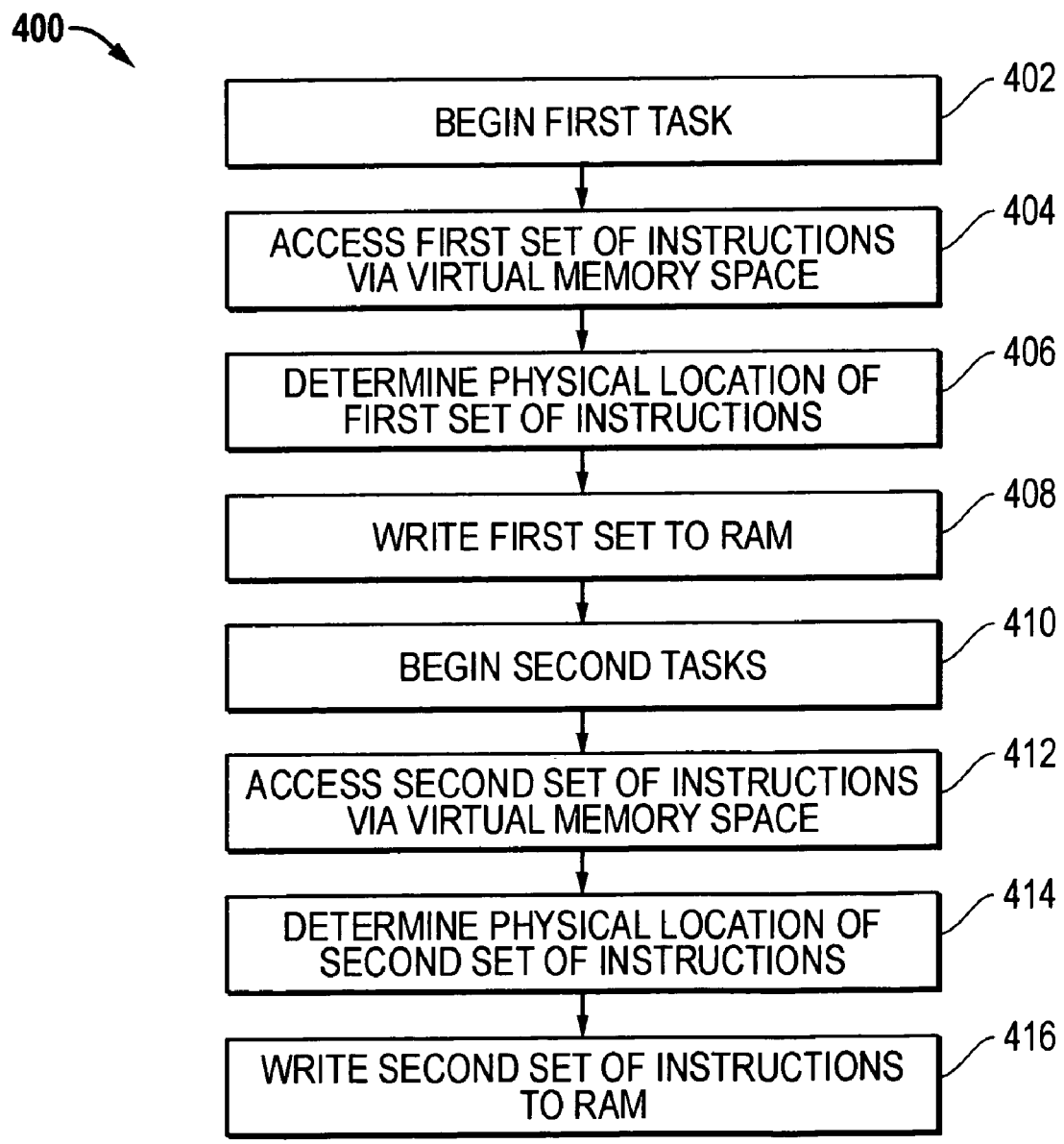
FIG. 4 includes an illustration of an exemplary method for use by a computational system, such as the exemplary computational system illustrated in FIG. 1.

FIGS. 2 and 3 include illustrations of the virtual memory space translation. When the processor accesses an instruction via a virtual address of the virtual memory space 204, the MMU 202 translates the virtual address to a physical location. The physical location may, for example, be a physical address on the first directly addressable memory 214 or the second directly addressable memory 216.

The virtual memory space 204 includes references to instruction sets. In one embodiment, the virtual memory space 204 includes a reference to a first set of instructions associated with a first task, a second set of instructions associated with a second task, and a third set of instructions associated with a third task. For example, the virtual memory space 204 may include an instruction set for a user interface implementation 206, an instruction set for graphic generation 208, and instruction sets for compress file decoding, such as Windows Media Audio (WMA) decompression 210 and MP3 (Movie Picture Experts Group (MPEG)-1 audio layer 3) decompression 212. In other exemplary embodiments, the virtual memory space 204 may reference instruction sets for decompressing files with Advanced Audio Coding (AAC), MPEG, Joint Photographics Experts Group (JPEG), Ogg Vodis (OGG) or other compression formats. As such, the processor may access a particular virtual memory space 204 to perform a plurality of tasks.

For example, virtual addresses representing MP3 decompression instructions 212 may be translated to a physical location 218 on the first directly addressable memory 214 on which the MP3 decompression instructions 212 are stored. In another example, the virtual addresses representing WMA decompression instructions 210 may be translated to a physical location 220 on the second directly addressable memory 216 when the WMA decompression instructions 210 are located on the second directly addressable memory 216. In another example, the processor may access an instruction set, such as the user interface instruction set 206, located in non-volatile storage and not located on the first directly addressable memory 214 or the second directly addressable memory 216.

When the processor accesses instructions to perform a particular task, the MMU 202 translates the virtual address to a physical address. For example, the MMU 202 may include a table, such as the table illustrated in FIG. 3. FIG. 3 includes a representation of a translation table but is not intended to illustrate a particular address format. When the MMU 202 receives a virtual address, the MMU 202 translates the virtual address to a physical location. For example, when the processor accesses a virtual address 0×1000, the MMU 202 may translate the virtual address to the physical address 0×9000, such as a physical location on the second directly addressable memory 216. In another example, the virtual address 0×3000 may be translated to a physical address 0×8000, such as to a physical location on the first directly addressable memory 214. In a further example, the MMU 202 may determine that instructions located at a virtual address, such as 0×2000, are not located at a physical location associated with the first directly addressable memory 214 or the second directly addressable memory 216.

Based on the determined physical location of the accessed instructions, instructions may be written to the first directly addressable memory 214 or the second directly addressable memory 216. Returning to FIG. 2, when the processor accesses the virtual address space, the MMU 202 provides a translation. When the instructions are located on the first directly addressable memory 214, such as, for example, the MP3 instruction set 212 at location 218, the processor may move portions of the instructions to the dedicated instruction cache for execution. Alternatively, when the instructions are located on the second directly addressable memory 216, such as the WMA instructions 210 at location 220, the processor may move portions of the instructions to the dedicated instruction cache and may move the instructions to the first directly addressable memory 214. In a further example, when the instructions are located in the non-volatile storage, the instructions may be moved to the first directly addressable memory 214 or the second directly addressable memory 216.

When the first directly addressable memory 214 is full, older instructions may be overwritten by instructions accessed more recently. In one embodiment, the older instructions are written to second directly addressable memory 216 when such instructions are not currently located at the second directly addressable memory 216. However, the older instructions are not written to the non-volatile storage. The MMU updates the virtual address map to indicate the new instruction set availability.

The virtual memory space may also reference non-instruction data physically located on the first directly addressable memory 214 or the second directly addressable memory 216. In one particular embodiment, when non-instruction data is overwritten on the first directly addressable memory 214, the non-instruction data may be written to the second directly addressable memory 216. However, the non-instruction data is not written to the non-volatile storage.

Turning to FIG. 4, the computational system may manage memory in accordance with the illustrated method 400. When the processor begins a first task, as illustrated at 402, the processor may access a first set of instructions via the virtual memory space, as illustrated at 404. The virtual memory space includes references to instruction sets associated with one or more tasks. A task may, for example, include user interface interaction, graphic generation, or compressed file decoding. In one exemplary embodiment, a compressed file decoding task includes MP3 decoding, WMA decoding, AAC decoding, JPEG decoding, MPEG decoding, or MP4 decoding.

To perform the task, an MMU determines the physical location of the first set of instructions, as illustrated at 406. For example, the MMU may translate a virtual address to a physical address based on entries in a table. When an instruction set is located at a physical location that is easily accessed by the processor, such as on a first directly addressable memory, the processor may access the instruction set, writing portions of the instruction set to a dedicated instruction cache.

However, when the instruction set is located at a physical location other than the first directly addressable memory, the instruction set is written to the first directly addressable memory, as illustrated at 408. For example, when the instruction set is located on non-volatile storage, the instruction set may be read from the non-volatile storage and written to the first directly addressable memory. In one particular embodiment, instruction sets located on the non-volatile storage are read-only instruction sets. In another example, the instruction set may be located on second directly addressable memory. The second directly addressable memory may have lower access efficiency than the first directly addressable memory. The instruction set is read from the second directly addressable memory and written to the first directly addressable memory. For example, the instruction set is written from SDRAM to the general-purpose SRAM cache by way of a data bus. The MMU updates the virtual address map to indicate the new instruction set is available.

The processor may perform a second task, as illustrated at 410. In one embodiment, the processor performs the first task at a first time and performs the second task at a second time. For example, the processor may begin decoding a file with a different compression format or may switch to a user interface task from a decoding task. In contrast to traditional memory management, the processor accesses a second set of instructions associated with the second task via the common virtual address space accessed when performing the first task, as illustrated at 412. An MMU determines the physical location of the second set of instructions associated with the second task, as illustrated at 414. Based on the physical location, the second set of instructions may be written to first directly addressable memory, as illustrated at 416.

In one embodiment, older instructions, such as the first instruction set, located on the first directly addressable memory may be written to second directly addressable memory and the physical location on the first directly addressable memory may be overwritten with instructions, such as the second instruction set, associated with a task being performed. However, the instruction sets are not written to the non-volatile storage. In one particular embodiment, non-instruction data associated with the performance of the first task is not written to the non-volatile storage.

Particular embodiments of the above disclosed computation system and methods permit automated management of the physical location of instructions and non-instruction data, reducing programmer efforts to manage memory. In contrast, traditional code overlay memory management systems involve programmers that code memory management, requiring considerable effort, leading to higher cost and longer product-to-market times. In addition, the particular disclosed embodiments may reduce overall activity of non-volatile storage, such as hard drives, reducing power consumption. In contrast, traditional automated memory management techniques use different virtual address spaces for each task, leading to frequent writing and reading from storage. Such frequent storage access consumes power, reducing battery life.

Embodiments of the computational system are useful in embedded systems. An embedded system is a special-purpose computer system, which is completely encapsulated by the device it controls. An embedded system has specific inputs and performs pre-defined tasks, unlike general purpose computer systems. Embodiments of the computational system are particularly useful for portable devices, such as portable audio and video players. In one particular embodiment, each of the tasks that the computational system is configured to perform is accessible via a common virtual memory space. Embodiments of the methods described above are also suited for use in limited application systems in which a limited number of tasks having memory profiles less than about 1 MB is performed. Exemplary methods may be implemented in software instructions executable by processors and logic units within devices and also stored in random access memory (RAM) or read only memory (ROM). Further, software instructions operable to perform the exemplary methods may be stored on a computer readable medium, such as solid state storage (e.g., RAM and ROM), optical storage (e.g., CDs and DVDs), and magnetic storage (e.g., floppy disks and hard drives).

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computational system comprising:
   a processor configured to access a common virtual memory space to perform a first task of a plurality of tasks and configured to access the common virtual memory space to perform a second task of the plurality of tasks, the common virtual memory space referencing a first set of instructions associated with the first task and referencing a second set of instructions associated with the second task; and
   a memory management unit accessible to the processor, the memory management unit configured to determine corresponding physical addresses of the first and second sets of instructions;
   wherein the processor is further configured to write the first set of instructions to one of a first directly addressable memory and a second directly addressable memory when the first task is to be performed by the processor and upon determining that the first physical address is located within an indirectly addressable secondary memory and is not located within the first directly addressable memory and is not located within the second directly addressable memory.

2. The computational system of claim 1, wherein the computational system is an embedded system.

3. The computational system of claim 1, wherein the common virtual memory space references a third set of instructions associated with a third task.

4. The computational system of claim 1, wherein the first directly addressable memory has a higher efficiency than The second directly addressable memory.

5. The computational system of claim 1, wherein the first directly addressable memory is located on a substrate common to the processor.

6. The computational system of claim 1, wherein the indirectly addressable secondary memory includes at least one of the first physical address and the second physical address.

7. The computational system of claim 1, wherein The plurality of tasks include tasks selected from a group consisting of a compressed file decoding task, a user interface interaction task, and a graphic generation task.

8. The computational system of claim 1, wherein the plurality of tasks comprises a compressed file decoding task, the compressed file decoding task comprising decoding files compressed with an algorithm selected from a group consisting of Windows Media Audio (WMA), Movie Picture Experts Group (MPEG)-1 audio layer 3 (MP3), Joint Photographics Experts Group (JPEG) and Advanced Audio Coding (AAC).

9. The computational system of claim 1, wherein the processor is configured to access the second set of instructions when performing the first task.

10. The computational system of claim 1, wherein after the first set of instructions has been executed the first set of instructions is written to the second directly addressable memory and the second set of instructions is written to the first directly addressable memory.

11. The computational system of claim 1, wherein the processor is further configured to move the first set of instructions from the second directly addressable memory to the first directly addressable memory when the first task is to be performed by the processor and the first physical address is within the second directly addressable memory.

12. The computational system of claim 1, wherein the processor is further configured to move the second set of instructions to the first directly addressable memory and to overwrite the first set of instructions within the first directly addressable memory when the second task is to be performed by the processor and the second physical address is determined to be located within the indirectly addressable secondary memory and is not located within the first directly addressable memory.

13. The computational system of claim 1, wherein the processor is further configured to move the second set of instructions from the indirectly addressable secondary memory to the second directly addressable memory when the second task is to be performed by the processor.

14. The computational system of claim 1, wherein the first set of instructions comprises encoded audio file decompression instructions.

15. The computational system of claim 1, wherein the second set of instructions comprises Windows Media Audio (WMA) decompression instructions.

16. A method of performing a plurality of computational tasks, the method comprising:
    accessing a first set of instructions and a second set of instructions via a common virtual memory space, the first set of instructions associated with a first computational task and the second set of instructions associated with a second computational task, the common virtual memory space referencing the first set of instructions and the second set of instructions;
    determining a first physical address associated with the first set of instructions using a memory management unit; and
    writing the first set of instructions to one of a first directly addressable memory and a second directly addressable memory when the first task is to be performed by the processor and upon determining that the first physical address is located within an indirectly addressable secondary memory and is not located within the first directly addressable memory and is not located within the second directly addressable memory.

17. The method of claim 16, further comprising:

determining a second physical address associated with the second set of instructions; and writing the second set of instructions to the first directly addressable memory when the second task is to be performed by the processor and when the second physical address is located within the second directly addressable memory or within the indirectly addressable secondary memory.

18. The method of claim 16, wherein the first computational task is selected from the group consisting of a compressed file decoding task, a user interface interaction task, and a graphic generation task.

19. The method of claim 16, wherein the first computational task comprises decoding files compressed with an algorithm selected from a group consisting of Windows Media Audio (WMA), Movie Picture Experts Group (MPEG)-1 audio layer 3 (MP3), Joint Photographics Experts Group (JPEG) and Advanced Audio Coding (AAC).

20. The method of claim 16, wherein the memory management unit includes a lookup table that associates a virtual address that is associated with a set of instructions with a corresponding physical address.

21. A computational system comprising:

a processor configured to access a common virtual memory space to perform a first task of a plurality of tasks and configured to access the common virtual memory space to perform a second task of the plurality of tasks, the common virtual memory space referencing a first set of instructions associated with the first task and referencing a second set of instructions associated with the second task;

a first directly addressable memory accessible to the processor;

a second directly addressable memory accessible to the processor, the first directly addressable memory having a higher access efficiency than the second directly addressable memory; and a memory management unit accessible to the processor, the memory management unit configured to determine a first physical address associated with the first set of instructions and a second physical address associated with the second set of instructions;

wherein the processor is further configured to move at least one of the first and second sets of instructions to one of the first and second directly addressable memories when the associated first or second task is to be performed by the processor and when a corresponding physical address is located within an indirectly addressable secondary memory and is not located within the first and the second directly addressable memories.

22. The computational system of claim 21, wherein the processor and the first directly addressable memory are located on a common substrate.

23. The computational system of claim 21, further comprising a dedicated instruction cache, wherein the processor is further configured to move a portion of one of the first and second sets of instructions from one of the first and second directly addressable memories to the dedicated instruction cache when the associated first or second task is to be performed by the processor.

24. The computational system of claim 21, wherein the memory management unit is further configured to translate a virtual address associated with the first or second sets of instructions to the corresponding physical address based on a table residing in the memory management unit.

* * * * *